3,350,441
PROCESS OF PREPARING CLEVE'S ACID
George B. Leightle, Roselle Park, N.J., assignor to General Aniline & Film Corporation, New York, N.Y., a corporation of Delaware
No Drawing. Filed Mar. 29, 1965, Ser. No. 443,710
5 Claims. (Cl. 260—508)

ABSTRACT OF THE DISCLOSURE

Cleve's acids are prepared by an improved process which comprises reducing an aqueous slurry of a mixture of isomeric 5-nitro and 8-nitro naphthalene-2-sulfonic acids with about 3.55 to about 4.35 moles of iron and from about 0.0258 to about 0.0314 mole 78% sulfuric acid at a temperature between 95°–100° C., filtering the reduced mass and evaporating the filtrate to a concentration ranging from 8 to 20% by volume of the isomeric aminonaphthalene sulfonic acids, treating the concentrated filtrate with about 0.0139 to 0.017 mole of zinc dust at a temperature between 60°–70° C., followed by acidification with either sulfuric acid or hydrochloric acid at a temperature of from 20° to 70° C. and isolating the Cleve's acids by filtration.

---

This invention relates to an improved process of preparing Cleve's acid and particularly to the reduction of a mixture of 5-nitro and 8-nitro naphthalene-2-sulfonic acids with iron and dilute sulfuric acid which does not require treating the reduction mass with alkaline material prior to filtration.

It is known that aminonaphthalene sulfonic acids can be prepared by several methods. The first reduction of 5- and 8-nitro naphthalene-2-sulfonic acids was described by Erdman, Annalen der Chemie, 275, 1893, in which he employed iron and glacial acetic acid and after reduction, alkalized the mass with sodium carbonate prior to filtration. Subsequent methods employed ammonia as the alkalizing medium prior to filtration to remove the iron. U.S. Patent 2,036,661 describes a method of separating the 5-amino and 8-aminonaphthalene-2-sulfonic acids from a neutral solution obtained by sulfonating naphthalene followed by nitration, liming, reducing, and after reduction, sodiating the mass before filtering off the iron. One of the common methods of preparing 5-and 8-aminonaphthalene-2-sulfonic acids is described by Kirk and Othmer in their Encyclopedia of Chemical Technology, volume 9, page 263, which involves reduction of the corresponding nitro compounds with iron and then making the reduction mass alkaline before filtering off the iron oxide.

In the "Chemistry of Synthetic Dyes," volume I, page 187, 1952, by K. Venkataraman, there is described the preparation of 5- and 8-aminonaphthalene-2-sulfonic acids by reduction with iron and acetic acid followed by neutralization of the reduced mass with lime.

The customary present-day technique requires the removal of the soluble iron by filtration, after first treating the finished reduction mass with sodium carbonate or magnesium oxide to an alkaline pH.

It is the principal object of the present invention to provide a simpler and more economical method of preparing Cleve's acid by the reduction of a mixture of 5-nitro and 8-nitro naphthalene-2-sulfonic acids with iron and dilute sulfuric acid which does not require treating the reduction mass with sodium carbonate, ammonia, magnesia, sodium hydroxide or any other alkaline material prior to filtration.

Other objects and advantages will become more clearly manifest from the following description.

In accomplishing the foregoing objects, an aqueous slurry containing from about 3.55 to about 4.35 moles of iron borings (about 50–70 mesh) and from about 0.0258 to about 0.0314 mole of 78% sulfuric acid is heated to a temperature ranging between 95 and 98° C. To the heated slurry, about 1.33 to about 1.63 moles of a mixture of nitronaphthalene sulfonic acids is added. The mixture, which results from the conventional mononitration of naphthalene-β-sulfonic acid, contains about 30–36% of 5-nitronaphthalene-2-sulfonic acid and about 30–40% of 8-nitronaphthalene-2-sulfonic acid. The addition of the mixed nitro isomers is carried out over an 8–12 hour period at a temperature between 99 and 100° C. When the addition is completed, the mass is held at a temperature of from 99 to 100° C. for a period of time ranging from about 1½ to 2½ hours, then diluted with water to about one-half to twice the original volume and filtered. The filtrate is evaporated to a concentration ranging from 8 to 20% by volume of the isomeric aminonaphthalene sulfonic acids. To the concentrated solution there is added at a temperature ranging from 60–65° C. about 0.0139 to 0.017 mole of zinc dust, then over a period of from 2½ to 3½ hours there are added from about 2.12 to 2.58 moles of 78% sulfuric acid at a temperature ranging between 60 and 70° C. The mixed Cleve's acid containing about 30–36% of 5-aminonaphthalene-2-sulfonic acid and about 30–40% of 8-aminonaphthalene-2-sulfonic acid is isolated by filtration, followed by washing once or twice with water. In other words, the mixed Cleve's acid is precipitated from the concentrated filtrate by acidification with a mineral acid such as sulfuric acid or hydrochloric acid over a temperature ranging from 60° to 70° C. The concentrated filtrate should contain from 8 to 20% by volume of the amino derivatives which are isolated after acidification by filtration at a temperature of from 20°–70° C., followed by washing with water.

By the use of the foregoing procedure, there are numerous definite operational and economic advantages. No alkaline material is necessary to precipitate the soluble iron. The soluble iron is allowed to remain in solution. This gives a reduction liquor which when treated with acid gives a fast filtering, dry crystalline product. There is no delay, once the reduction is completed, in the final filtration. Since the reduction mass is not treated with an alkaline material, excellent filtration is obtained which requires less mechanical manipulation. The elimination of an alkalizing agent after reduction provides for a filtered reduction liquor which is free of ions such as sodium and potassium. This is of great advantage since the product precipitated from a solution of this type produces distinct and well-defined crystals of excellent filtrability. The process provides for an improved quality and physical form of the Cleve's acids and, in addition, provides an economic and operational advantage when used in the production of 5-amino-2-naphthols and 8-amino-2-naphthols, by reducing the charging time of the Cleve's acid and improving the yield and quality of the said naphthols. The over-all advantage of the process is its lower cost of operation.

The mixed nitro naphthalene sulfonic acids which are reduced to Cleve's acid in accordance with the present invention may also be those which are supplied commercially in solution form. From this solution about 75% of the theoretical β-nitro isomers can be isolated which consists approximately of 4% of 8-nitro naphthalene-1-sulfonic acid; 8% of 5-nitro naphthalene-1-sulfonic acid; 30% of 5-nitro naphthalene-2-sulfonic acid; 38% of 8-nitro naphthalene-2-sulfonic acid; and 20% of alpha-sulfonic acid compounds.

The following examples are given to more fully illustrate my invention. All parts given are by weight.

Example 1

250 parts of water, 200 parts (3.94 moles) of iron borings and 2.8 parts (0.0286 mole) of 78% sulfuric acid were heated to 95–98° C. and then to this mixture were added 375 parts (1.48 moles) of a mixture of 30% 5-nitro and 38% of 8-nitro naphthalene-2-sulfonic acids. The addition was carried out over a 10-hour period at 99–100° C. When the addition was completed, the mass was held at 99–100° C. for 2 hours, then diluted with water and filtered.

The filtrate was evaporated to a concentration of 16% by volume 5- and 8-aminonaphthalene-2-sulfonic acids. To the concentrated solution there was added at 60–65% C., 1 part (0.0154 mole) of zinc dust and then over a three-hour period at 60–65° C. there were added 230 parts (2.35 moles) of 78% sulfuric acid. The product was isolated by cooling the mass to 25° C., at which point it was filtered and washed with cold water. The yield was 215 grams and was of good quality.

Example 2

The procedure of Example 1 was repeated with the exception that the filtration of the final product was carried out at 60° C. instead of 25° C. The yield was 200 grams and was of good quality. The filtration was very rapid and crystal formation was good.

Example 3

Example 1 was again repeated with the exception that 230 parts of 78% sulfuric acid were added at 25° C. over three hours, instead of at 60–65° C., to precipitate the product, after which it was filtered. The filtered product was washed with cold water to give a yield of 282 grams of good quality.

Example 4

Example 1 was again repeated with the exception the filtered reduction liquor was adjusted to a concentration of 10% by volume. There were then added 230 parts of 78% sulfuric acid over a three-hour period at 60–65° C. The reduction mass was cooled to 25° C. and the product isolated by filtration and washed with cold water. The yield was 234 grams of good quality with both the filtration rate and crystal formation good.

Example 5

Example 1 was again repeated with the exception that the filtered reduction liquor was adjusted to 10% by volume and then 230 parts of 78% sulfuric acid added over three hours at 60–65° C. and the mass filtered at 60° C. The product was washed with cold water to yield 100 grams of good quality. Both the filtration rate and crystal formation were very good.

The mixed Cleve's acid prepared in accordance with the present invention can be employed as such or separated into the 5-amino and 8-aminonaphthalene-2-sulfonic acids. The mixture can be converted to the mixed 5-amino and 8-amino-2-naphthols by alkali fusion. The mixed naphthols are useful as dye intermediates. The isomers can be readily separated by simply charging the mixture to water, adjusting the pH to the alkaline side with sodium hydroxide and sodium carbonate and then charging sodium chloride, at which point the 8-aminonaphthalene-2-sulfonic acid is precipitated from the liquor as the sodium salt and the 5-aminonaphthalene-2-sulfonic acid remains in solution of the liquor. The precipitated 8-aminonaphthalene-2-sulfonic acid is filtered off and washed with aqueous sodium chloride to remove the liquors. The liquor is then acidified with sulfuric acid which precipitates the 5-aminonaphthalene-2-sulfonic acid. This is filtered off and water washed. The separated isomers are then fused separately with sodium hydroxide to the corresponding naphthols and utilized as dye intermediates.

I claim:

1. The process of preparing Cleve's acids which comprises reducing an aqueous slurry of isomeric mononitrated naphthalene-β-sulfonic acids with 3.55 to about 4.35 moles of iron and with 0.0258 to about 0.314 mole of 78% sulfuric acid at a temperature between 95°–100° C., filtering the reduced mass and evaporating the filtrate to a concentration ranging from 8 to 20% by volume of the isomeric aminonaphthalene sulfonic acids, treating the concentrated filtrate with about 0.0139 to 0.017 mole of zinc dust at a temperature between 60°–70° C., followed by acidification with a mineral acid selected from the class consisting of sulfuric acid and hydrochloric acid at a temperature of from 20 to 70° C. and isolating the Cleve's acids by filtration.

2. The process of preparing Cleve's acids which comprises heating an aqueous slurry containing from about 3.55 to 4.35 moles of iron borings and from about 0.258 to about 0.0314 mole of 78% sulfuric acid at a temperature ranging between 95° and 98° C., adding to the heated slurry about 1.3 to 1.63 moles of an isomeric mixture of 5-nitro and 8-nitro naphthalene-2-sulfonic acids at a temperature between 99° and 100° C., filtering the resulting mass and evaporating it to a concentration ranging from 8 to 20% by volume of the isomeric 5- and 8-aminonaphthalene-2-sulfonic acids, adding to the evaporated concentrate about 0.0139 to about 0.017 mole of zinc dust, followed by acidification with about 2.12 to 2.58 moles 78% sulfuric acid and isolation of the isomeric 5- and 8-aminonaphthalene sulfonic acids by filtration at a temperature ranging from 20° to 70° C.

3. The process of preparing Cleve's acids which comprises heating an aqueous slurry containing about 3.94 moles of iron borings and about 0.03 mole of 78% sulfuric acid at a temperature of from 95 to 98° C., adding to the heated slurry about 1.48 moles of an isomeric mixture of 5-nitro and 8-nitro naphthalene-2-sulfonic acids at a temperature between 99° and 100° C., filtering the resulting mass and concentrating the filtrate by evaporation to 16% by volume of the isomeric 5- and 8-aminonaphthalene-2-sulfonic acids, adding to the concentrated filtrate about 0.015 mole of zinc dust while maintaining a temperature between 60°–65° C., followed by acidification with about 2.35 moles of 78% sulfuric acid and isolating the isomeric 5- and 8-aminonaphthalene sulfonic acids, Cleve's acids, by filtration at about ambient temperature.

4. The process according to claim 1, wherein the acidification with said mineral acid is at 25° C.

5. The process according to claim 1, wherein the acidification with said mineral acid is at 60° C.

References Cited

UNITED STATES PATENTS

| | | | |
|---|---|---|---|
| 405,938 | 6/1889 | Andresen | 260—508 |
| 1,728,607 | 9/1929 | Gubelmann et al. | 260—508 |
| 2,058,911 | 10/1936 | Rapp | 260—508 |
| 3,123,645 | 3/1964 | Hagenboecker | 260—508 |

LORRAINE A. WEINBERGER, *Primary Examiner.*

M. WEBSTER, *Assistant Examiner.*